Feb. 12, 1924. 1,483,543
I. BEST
TIRE ALARM
Filed Aug. 12, 1922
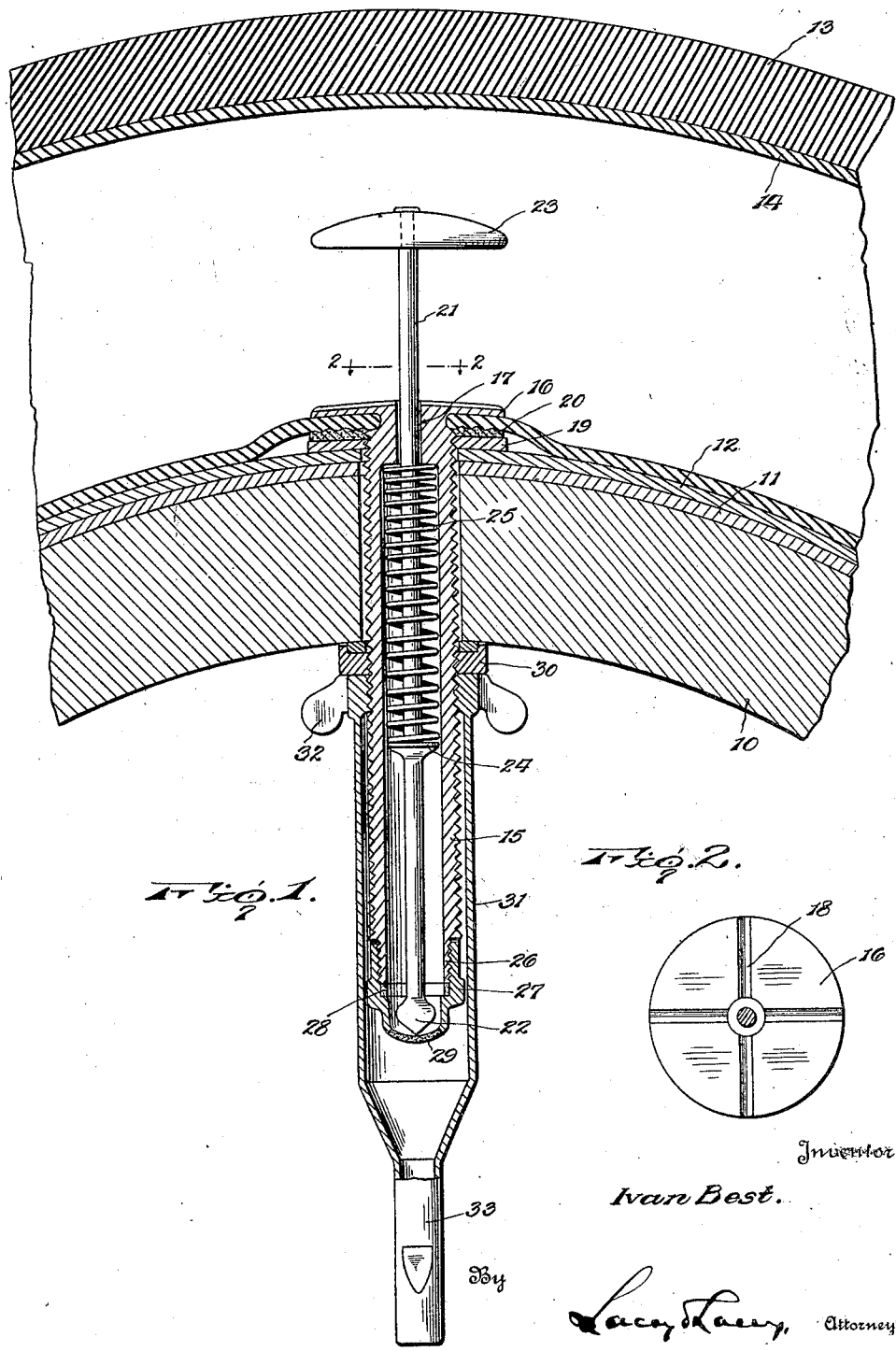

Patented Feb. 12, 1924.

1,483,543

UNITED STATES PATENT OFFICE.

IVAN BEST, OF MORLAND, KANSAS.

TIRE ALARM.

Application filed August 12, 1922. Serial No. 581,481.

*To all whom it may concern:*

Be it known that I, IVAN BEST, citizen of the United States, residing at Morland, in the county of Graham and State of Kansas, have invented certain new and useful Improvements in Tire Alarms, of which the following is a specification.

This invention relates to an improved tire alarm for motor vehicles and seeks, as one of its principal objects, to provide a device which will automatically operate to sound an alarm when a tire becomes punctured or from any other cause becomes deflated.

The invention has a further object to provide a device embodying a closure cap serving to normally retain the air within the tire and wherein a plunger will be provided for puncturing said cap when the tire becomes soft so that the air remaining in the tire will be released through the cap to sound an alarm.

And the invention has as a still further object to provide a device which may be readily employed in connection with conventional motor vehicle tires and which will require minimum structural change in the ordinary vehicle wheel to accommodate the device.

Other and incidental objects will appear hereinafter.

Figure 1 is a vertical sectional view showing my improved device in connection with an ordinary motor vehicle wheel and tire, and Figure 2 is a detail sectional view on the line 2—2 of Figure 1, looking in the direction of the arrows.

Referring now more particularly to the drawings, I have, for convenience, shown my improved device in connection with a conventional motor vehicle wheel and tire. The wheel felly is indicated at 10 and the felly band at 11. Fitting the felly band is a rim 12 and engaged with said rim is a tire casing 13 in which is arranged the usual inner tube 14. In carrying the invention into effect, I employ a tubular casing 15 which is provided at its outer end with an annular head 16 and leading from the casing through the head is a reduced axially disposed opening 17, the head being, as shown in Figure 2, provided with a plurality of grooves 18 radiating from said opening. The head is inserted through a suitable opening in the inner tube 14 to lie within said tube while the felly 10, felly band 11, and rim 12 are provided with registering openings to freely accommodate the casing 15 so that when the rim with the tire thereon is applied to the wheel, the casing may be easily projected through the felly. Threaded upon the casing is a nut 19 and arranged between said nut and the pneumatic inner tube 14 is an appropriate washer 20 clamped by the nut to form a sealed joint between the casing and inner tube. Freely slidable through the opening 17 of the casing is a plunger stem 21 provided at its inner end with a pointed terminal 22 and fixed upon the outer end of said stem is a head 23, it being understood that the terms "inner" and "outer" are intended to denote position in relation to the hub of the wheel. As will be observed, the stem is formed with an annular shoulder 24 and bearing between said shoulder and the outer end wall of the casing is a spring 25 pressing the plunger inwardly, this spring being employed to prevent reciprocation of the plunger as the wheel revolves. At its inner end, the casing is formed with a reduced nipple 26 and threaded upon said nipple is a closure cap 27 in which is arranged an appropriate gasket 28 forming a sealed joint between the cap and the casing. Thus, the cap will normally serve to prevent escape of air from the inner tube 14 through the casing. Mounted in the end wall of the cap is a preferably soft metallic insert 29 against which the pointed terminal 22 of the plunger stem rests. Threaded upon the casing to bear against the inner face of the felly is an appropriate binding nut 30 and threaded upon the casing to bear against said nut is a dust cap 31 preferably provided at its outer end with wings 32 so that the cap may be readily applied or removed. Formed on the cap at its inner end or otherwise secured thereto is an air whistle 33 opening into the cap so that air flowing through the casing will pass out through the whistle for sounding said whistle.

As will now be observed, when the insert 29 of the closure cap 27 is intact, the plunger will be held depressed by said cap so that the head 23 of said plunger will lie medially of the inner tube 14. Accordingly, when the inner tube 14 becomes punctured or otherwise partially deflated, the load upon the wheel will cause the tube to be flattened into engagement with the head 23 of the plunger so that said plunger will be forcibly shifted, causing the terminal 22 thereof to puncture the insert 29 of the closure cap. When this occurs, the air remaining in the inner tube will, of course, escape through the casing 15 into the dust cap 30 for sounding the whistle 33. Thus, when a tire becomes soft, the device will automatically operate to sound an alarm apprising the driver of the vehicle of the condition of the tire. The grooves 18 in the head of the casing 15 are provided so that when the head 23 of the plunger is moved into engagement with the head 16, air may escape beneath the head 23 through said grooves. After the inner tube has been repaired, the cap 27 may be again closed by fusing the insert 29 or a new closure cap may be applied to the casing 15 for holding the plunger set. I accordingly provide a particularly efficient device for the purpose set forth and, in this connection, it is pointed out that the present device is to be used auxiliary to the ordinary inflation valve of the inner tube, said valve, however, not being shown.

Having thus described the invention, what is claimed as new is:

A tire alarm including a casing for connection to a pneumatic tube, a plunger having a continuous stem extending axially through and slidable within the casing, the stem being provided with a shoulder within the casing, and the diameter of the stem and the shoulder being less than the bore of the casing whereby to permit flow of air around the stem and the shoulder, a spring surrounding the stem and bearing between said shoulder and the outer end of the casing whereby to force the plunger inwardly, a cap threaded upon the inner end of the casing and provided with a frangible portion against which the inner end of the plunger constantly bears, a head upon the outer end of the plunger within the pneumatic tube, and a head upon the outer end of the casing secured within the pneumatic tube and provided with external grooves leading to the bore of the casing.

In testimony whereof I affix my signature.

IVAN BEST. [L. S.]